United States Patent
Tarte

(10) Patent No.: US 10,493,957 B2
(45) Date of Patent: Dec. 3, 2019

(54) OPERATIONAL MODE CHANGE BASED ON VEHICLE OCCUPANCY FOR AN AUTONOMOUS VEHICLE

(71) Applicant: Toyota Motor Engineering & Manufacturing North America, Inc., Erlanger, KY (US)

(72) Inventor: Christopher T. Tarte, Ann Arbor, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 441 days.

(21) Appl. No.: 15/240,149

(22) Filed: Aug. 18, 2016

(65) Prior Publication Data
US 2018/0050664 A1    Feb. 22, 2018

(51) Int. Cl.
*B60R 25/31* (2013.01)
*G05D 1/00* (2006.01)
*H04W 4/48* (2018.01)

(52) U.S. Cl.
CPC ........... *B60R 25/31* (2013.01); *G05D 1/0055* (2013.01); *G05D 2201/0213* (2013.01); *H04W 4/48* (2018.02)

(58) Field of Classification Search
CPC .... B60R 25/31; G05D 1/0055; G05D 1/0088; H04W 4/48
USPC ........................................................ 701/36
See application file for complete search history.

(56) References Cited

U.S. PATENT DOCUMENTS

| | | | |
|---|---|---|---|
| 7,124,007 B2 * | 10/2006 | Christl | B60N 2/002 701/45 |
| 9,139,091 B1 | 9/2015 | Penilla et al. | |
| 9,189,897 B1 * | 11/2015 | Stenneth | G07C 5/008 |
| 9,248,807 B2 | 2/2016 | Lee et al. | |
| 9,754,425 B1 * | 9/2017 | Iqbal | G07C 5/008 |
| 9,964,957 B2 * | 5/2018 | Yoon | B60W 30/06 |
| 10,005,458 B2 * | 6/2018 | Ohshima | G05D 1/0061 |
| 2011/0137490 A1 | 6/2011 | Bosch et al. | |

(Continued)

*Primary Examiner* — Anne M Antonucci
*Assistant Examiner* — James E Stroud
(74) *Attorney, Agent, or Firm* — Christopher G. Darrow; Darrow Mustafa PC

(57) ABSTRACT

Provided is a device and method for applying a control state based on vehicle occupancy of an autonomous vehicle. The method includes sensing an identification parameter for each of a set of initial vehicle occupants. The method prioritizes the vehicle authority level for the each vehicle occupant of the set of initial vehicle occupants, and producing an initial vehicle control priority among the set of initial vehicle occupants. Based on the initial vehicle control priority, applying the vehicle control state parameter to an autonomous vehicle operational mode. The method, when a vehicle occupancy change event occurs, senses an identification parameter for each vehicle occupant of a set of subsequent vehicle occupants. The method continues by prioritizing the vehicle authority level for the each vehicle occupant of the set of subsequent vehicle occupants and producing a subsequent vehicle control priority among the set of subsequent vehicle occupants. Based on the subsequent vehicle control priority, the method proceeds by replacing the vehicle control state parameter to the autonomous vehicle operational mode.

20 Claims, 6 Drawing Sheets

(56) References Cited

U.S. PATENT DOCUMENTS

| | | | |
|---|---|---|---|
| 2014/0358376 A1* | 12/2014 | Phelan | B60W 10/18 701/41 |
| 2015/0338852 A1 | 11/2015 | Ramanujam | |
| 2015/0346718 A1* | 12/2015 | Stenneth | G06Q 30/0611 701/2 |
| 2016/0023665 A1* | 1/2016 | Sherony | B60W 50/12 701/2 |
| 2016/0026182 A1* | 1/2016 | Boroditsky | H04L 67/306 701/23 |
| 2016/0088086 A1* | 3/2016 | Cuddihy | H04L 67/12 455/41.2 |
| 2016/0167607 A1* | 6/2016 | Rai | H04L 67/34 701/36 |
| 2016/0167608 A1* | 6/2016 | Rai | B60W 10/30 701/36 |
| 2016/0288796 A1* | 10/2016 | Yuan | B60R 25/01 |
| 2016/0303969 A1* | 10/2016 | Akula | B60K 35/00 |
| 2017/0212511 A1* | 7/2017 | Paiva Ferreira | G06Q 10/08 |
| 2017/0369052 A1* | 12/2017 | Nagy | B60W 50/08 |

\* cited by examiner occupancy control unit 200

FIG. 4
identification parameter 400

| identification field 402 | priority field 404 | vehicle authority level field 406 | vehicle control state parameter 408 ||||
|---|---|---|---|---|---|---|
| | | | range field 410 | speed field 412 | roadway field 414 | time-of-day field 416 | notification field 418 |

*Note: vehicle control state parameter 408 spans range, speed, roadway, time-of-day, notification fields.*

FIG. 5
identification parameter 500 (populated)

| identification field 402 | priority field 404 | vehicle authority level field 406 | vehicle control state parameter 508 | | | | |
|---|---|---|---|---|---|---|---|
| | | | range | speed | roadway | time-of-day | notification |
| Adult_01 | 01 | administrator | ∞ | ∞ | ∞ | ∞ | {text := Adult_02} |
| Adult_02 | 02 | adult | ∞ | ∞ | ∞ | ∞ | {text := Adult_01} |
| Teen_01 | 05 | juvenile | 15 | 40 | streets | daytime | {text, email := Adult_01, Adult_02} |
| Teen_02 | 04 | juvenile | 25 | 50 | toll | 0800-2100 | {text := Adult_01, Adult_02} |
| Adult_03 | 03 | juvenile | 30 | ∞ | ∞ | 2100-0600 | {text := Adult_01, Adult_02} |
| Unknown_01 | 99 | guest | ∅ | ∅ | ∅ | ∅ | {text, email, call := Adult_01} |
| ••• | ••• | ••• | ••• | ••• | ••• | ••• | ••• |
| ID_xx | priority_xx | authority_zz | ∞ | ∞ | ∞ | ∞ | {text, email, call := Adult_01} | initial vehicle
control priority vehicle occupancy
change event subsequent vehicle
control priority vehicle occupancy
change event
(null occupant set)

OPERATIONAL MODE CHANGE BASED ON VEHICLE OCCUPANCY FOR AN AUTONOMOUS VEHICLE

BACKGROUND

Highly automated driving systems are designed to operate vehicles on the road without driver interaction or other external control, for example, self-driving vehicles or autonomous vehicles. Also, these vehicles may have more restrictive operational limitations in place for greater increased safety and/or security for certain classes of occupants. For example, in the instance of children occupants, these limitations may include a permissible vehicle range and rate of speed/acceleration. It is desirable that automated driving systems be able to assess and prioritize the vehicle authority for each of the vehicle occupants, and to apply the prioritized vehicle authority for travel, and further desirable to alter the vehicle authority to reflect a change to the vehicle occupants.

SUMMARY

In one implementation, a method in an occupancy control unit is disclosed for applying a control state based on vehicle occupancy of an autonomous vehicle. The method includes sensing an identification parameter for each of a set of initial vehicle occupants. The identification parameter includes a vehicle authority level and a vehicle control state parameter. The method prioritizes the vehicle authority level for the each vehicle occupant of the set of initial vehicle occupants, and producing an initial vehicle control priority among the set of initial vehicle occupants. Based on the initial vehicle control priority, applying the vehicle control state parameter to an autonomous vehicle operational mode. The method determines whether a vehicle occupancy change event occurs. When the vehicle occupancy change event occurs, sense an identification parameter for each vehicle occupant of a set of subsequent vehicle occupants. The method continues by prioritizing the vehicle authority level for the each vehicle occupant of the set of subsequent vehicle occupants and producing a subsequent vehicle control priority among the set of subsequent vehicle occupants. Based on the subsequent vehicle control priority, the method proceeds by replacing the vehicle control state parameter to the autonomous vehicle operational mode.

In another implementation, disclosed is a method in a vehicle control unit for applying a control state based on vehicle occupancy to an autonomous vehicle. The method includes sensing a first set of vehicle occupants of the autonomous vehicle. The first plurality of vehicle occupants of the first set of vehicle occupants each possesses an identification parameter source associating an authority level and a vehicle control state parameter. The method continues by determining a first vehicle control priority based on the authority level for the each vehicle occupant of the first set of vehicle occupants, and applying the vehicle control state parameter to an autonomous vehicle operational mode based on the initial vehicle control priority. Upon determining whether a vehicle occupancy change event occurs, the method senses a second set of vehicle occupants of the autonomous vehicle, wherein at least one of the occupants of the second set of vehicle occupants possessing the identification parameter source including the authority level and the vehicle control state parameter. The method determines a second vehicle control priority based on the authority level for at least one vehicle occupant of the second set of vehicle occupants, and applies the second vehicle control state parameter to the autonomous vehicle operational mode based on the second vehicle control priority.

In another implementation, an occupancy control unit is disclosed. The occupancy control unit applies a control state based on vehicle occupancy of an autonomous vehicle. The occupancy control unit includes a wireless communication interface, one or more processors, and a memory. The wireless communication interface to service communications with user equipment and with a vehicle network. The one or more processors are coupled to the wireless communication interface, the one or more processors for controlling operations of the control unit. The memory being coupled to the one or more processors, the memory for storing data and program instructions used by the one or more processors. The one or more processors are configured to execute instructions stored in the memory to sense an identification parameter for each vehicle occupant of a set of initial vehicle occupants, wherein the identification parameter includes an authority level and a vehicle control state parameter. The occupancy control unit operates to determine an initial vehicle control priority based on the authority level for the each vehicle occupant of the set of initial vehicle occupants, and apply the vehicle control state parameter based on the initial vehicle control priority. The occupancy control unit determines whether a vehicle occupancy change event occurs, and when the vehicle occupancy change event occurs, the occupancy control unit operates to sense an identification parameter for each subsequent vehicle occupant of a set of subsequent vehicle occupants. The occupancy control unit determines a subsequent vehicle control priority based on the authority level for the each subsequent vehicle occupant of the set of subsequent vehicle occupants, and applies the subsequent vehicle control state parameter based on the subsequent vehicle control priority.

BRIEF DESCRIPTION OF THE DRAWINGS

The description makes reference to the accompanying drawings wherein like reference numerals refer to like parts throughout the several views, and wherein:

FIG. 4 shows an example of an identification parameter related to a vehicle occupant;

FIG. 5 shows an example of a populated identification parameter related to several possible vehicle occupants;

DETAILED DESCRIPTION

Provided is a device and method for changing autonomous vehicle operation based on the occupant changes caused by different destinations for the autonomous vehicle occupants.

Provided herein is an occupancy control unit and method operable to alter autonomous vehicle operation based on vehicle occupant changes over a route having multiple destinations caused by vehicle occupants departing and/or entering the vehicle. For example, when an adult and their teenage child occupy an autonomous vehicle, the path route includes a destination for each occupant, such as one destination for work, and the other for school. Regardless of the respective seating position, the occupancy control unit is operable to sense their presence, and rank the priority of the vehicle control state parameters for each occupant. The ranking control state parameters are applied to the autonomous vehicle operational mode (such as, a permissible range, speed, roadways, time-of-day, etc.). In the present example, the control state parameters are those for the adult occupant.

But on an occupancy change event, such as when the work destination is reached and the adult departs the autonomous vehicle, the remaining occupant of the vehicle is the teenage child. The occupancy control unit is operable to sense that the teenage child remains, and has the ranking control state parameters for teenage child (albeit limited as compared to those of the adult that departed) that are applied to the autonomous vehicle operational mode for autonomous travel to the second destination (that is, school).

In this regard, the occupancy control unit operates to take into consideration changes in autonomous vehicle occupants. Moreover, the occupancy control unit is operable to announce the occupancy change event, and provide a status of the autonomous vehicle occupants, as discussed in detail with reference to FIGS. 1-7.

Figure 1:
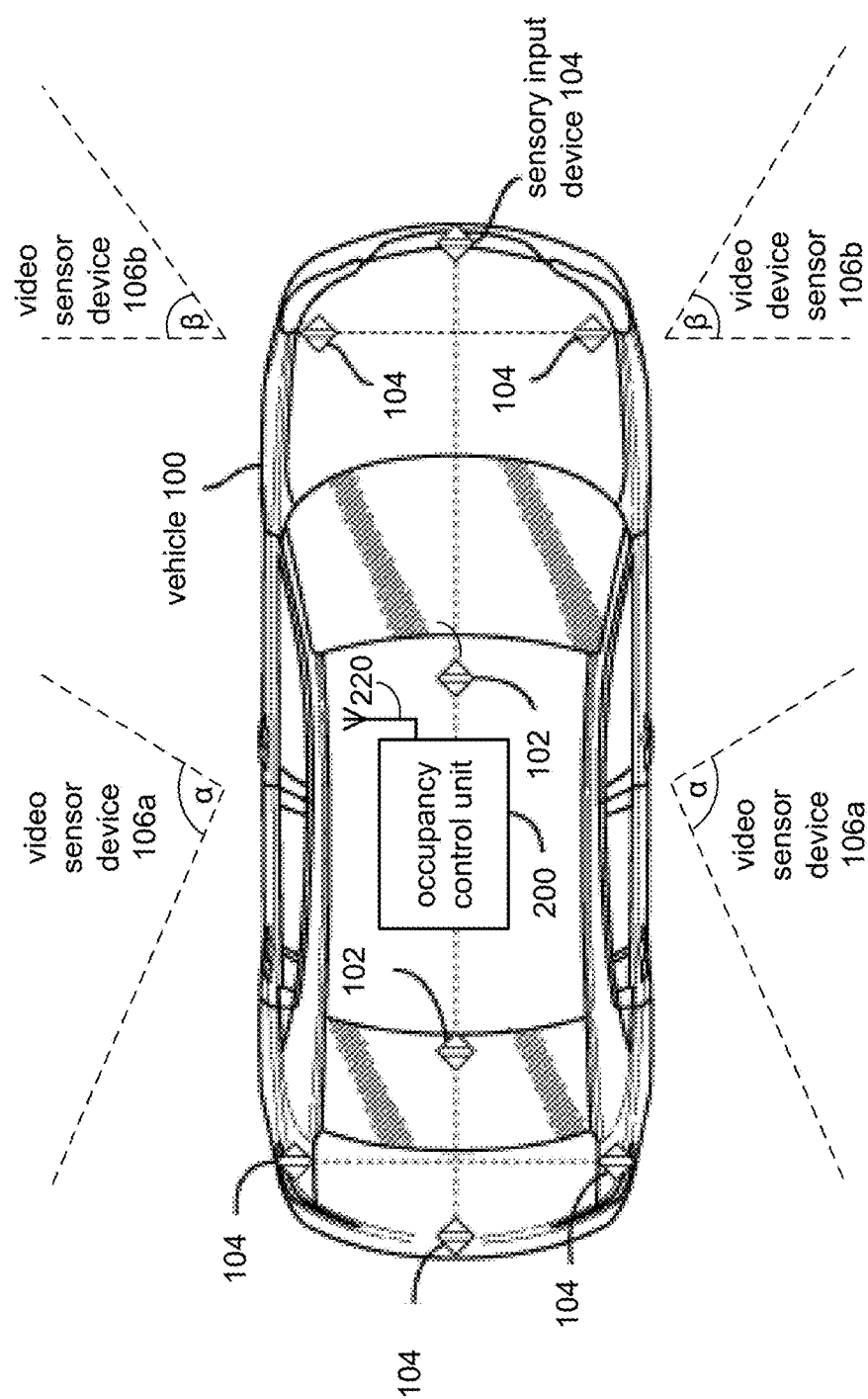
FIG. 1 is a schematic illustration of an autonomous vehicle including an occupancy control unit.

FIG. 1 is a schematic illustration of an autonomous vehicle 100 including an occupancy control unit 200. A plurality of sensor devices 102, 104 and 106 are in communication with occupancy control unit 200. The plurality of sensor devices 102, 104 and 106 can be positioned on the outer surface of the vehicle 100, or may be positioned in a concealed fashion for aesthetic purposes with regard to the vehicle. Moreover, the sensor devices may operate at frequencies in which the vehicle body or portions thereof appear transparent to the respective sensor device.

Figure 2:
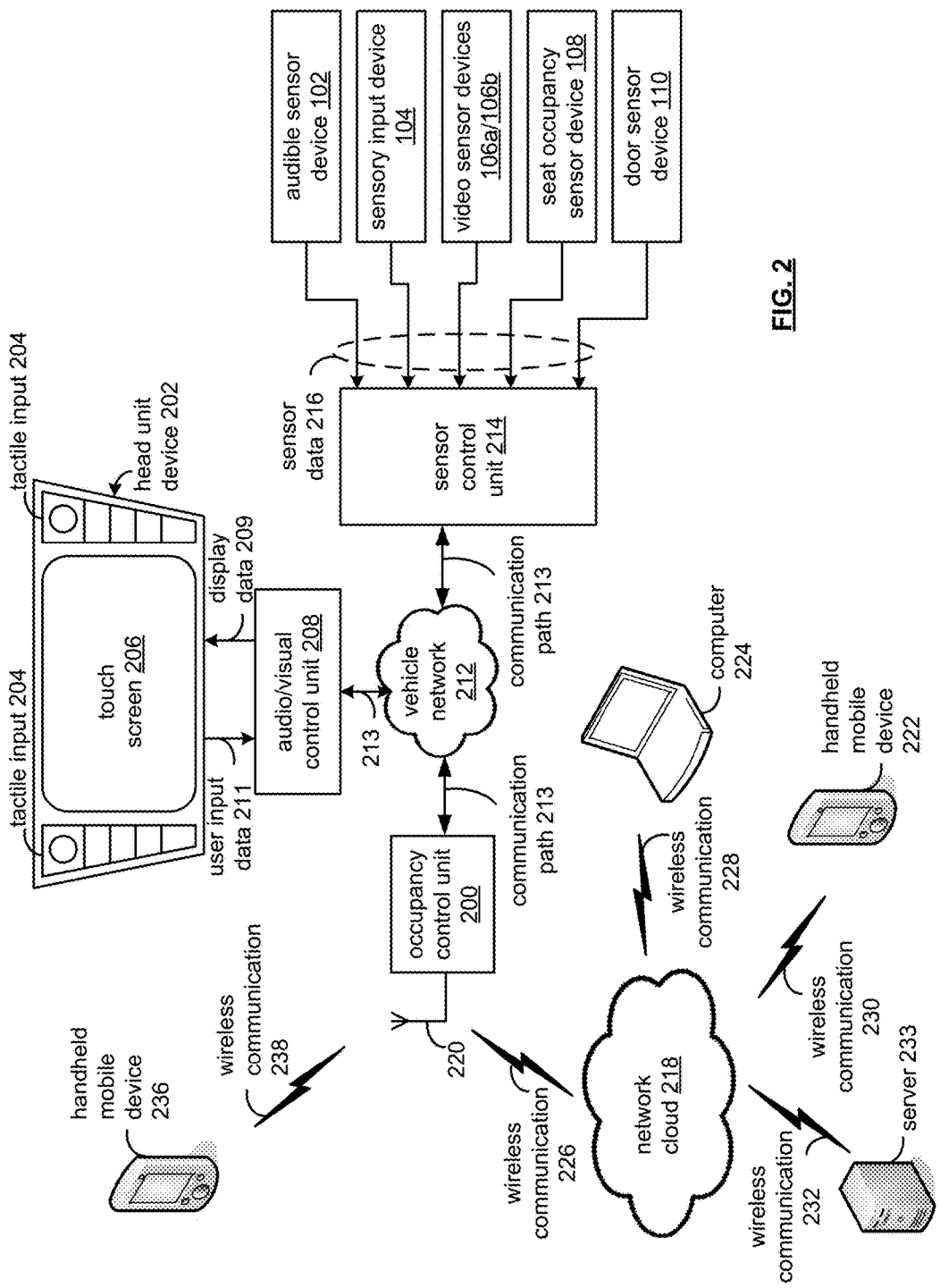
FIG. 2 shows a block diagram of an occupancy control unit of FIG. 1 in the context of a vehicle network environment.

Also, as discussed in further detail with respect to FIG. 2, the vehicle 100 includes a seat occupancy sensor device 108 and door sensor device(s) 110. The seat occupancy sensor device 108 operates to sense the occupants within, as well as communications sensing to determine an identity of the vehicle occupants. The door sensor device(s) 110 operates to sense the operation of vehicle doors, indicating a vehicle occupancy change event.

Communication between the sensor devices may be on a bus basis, and may also be used or operated by other systems of the vehicle 100. For example, the sensor devices 102, 104, 106 and 108 may be coupled by a Body Electronic Area Network (BEAN), a Controller Area Network (CAN) bus configuration, an Audio Visual Communication-Local Area Network (AVC-LAN) configuration, and/or a combination of communication-system architectures to provide digital communications between devices and systems of the vehicle 100. Moreover, the sensor devices 102, 104, 106 and/or 108 may be further coupled to the occupancy control unit 200 via such communication-system architectures.

The sensor devices 102, 104 and 106 operate to monitor ambient conditions relating to the vehicle 100, including audio, visual, and tactile changes to the vehicle environment. The sensor devices include audible sensor devices 102, sensory input devices 104, and video sensor devices 106a and 106b.

The audible sensor devices 102 provide audible sensing of the ambient conditions of the vehicle. With speech recognition capability, the audible sensor devices 102 may receive instructions to move, or to receive other such directions. The audible sensor devices 102 may be provided, for example, by a nano-electromechanical system (NEMS) or micro-electromechanical system (MEMS) audio sensor omnidirectional digital microphone, a sound-triggered digital microphone, etc.

The sensory input devices 104 provide tactile or relational changes in the ambient conditions of the vehicle, such as an approaching person, object, vehicle, etc. The sensory input devices 104. The one or more of the sensory input devices 104 can be configured to capture changes in velocity, acceleration, and/or distance to these objects in the ambient conditions of the vehicle 100, as well as the angle of approach. The sensory input devices 104 may be provided by a Light Detection and Ranging (LIDAR) system, in which the sensory input devices 104 may capture data related to laser light returns from physical objects in the environment of the vehicle 100. The sensory input devices 104 may also include a combination of lasers (LIDAR) and milliwave radar devices. As an example, the sensory input devices 104 may identify objects in the roadway (such as other vehicle, debris, etc.), and may identify objects adjacent the roadway that may present a hazard to the vehicle 100 (such as animals and/or debris coming within the roadway).

The video sensor devices 106a and 106b operate to capture still-frame of and/or video images within associated fields of view. For the example of FIG. 1, the video sensor device 106a has a three-dimensional field-of-view of angle-α, and the video sensor device 106b has a three-dimensional field-of-view of angle-β, with each video sensor having a sensor range for video detection.

In the various driving modes, the examples of the placement of the video sensor devices 106a for blind-spot visual sensing (such as for another vehicle adjacent the vehicle 100) relative to the vehicle user, and the video sensor devices 106b are positioned for forward periphery visual sensing (such as for objects outside the forward view of a vehicle user, such as a pedestrian, cyclist, etc.).

As may be appreciated, the occupancy control unit 200 may transmit captured still-frame of and/or video images from the video sensor devices 106a and 106b. For example, when the passenger and/or occupants exit or enter the vehicle 100, the occupancy control unit 200 may trigger the video sensor devices 106a and 106b to record the activity around the vehicle, including images capturing the vehicle passengers. The occupancy control unit 200, through the antenna 220, may transmit these images, along with time/date stamps, to authorized and/or designated recipients. An example of such individuals may be the vehicle owner and specified adults.

For controlling data input rates from the sensor devices 102, 104 and 106, the respective sensitivity and focus of each of the sensor devices may be adjusted to limit data acquisition based upon speed, terrain, activity, etc., around the vehicle.

For example, the field-of-view angles of the video sensor devices 106a and 106b may be initially in a fixed relation to the vehicle 100. The field-of-view angles may be adaptively increased and/or decreased based upon the vehicle's driving mode, such as a highway driving mode to take in less of the ambient conditions in view of the rapidly changing conditions relative to the vehicle 100, a residential driving mode to take in more of the ambient conditions that may change rapidly (such as a child's ball crossing in front of the vehicle, etc.), a parking mode in which a full field-of-view may be used to increase a sensitivity towards changes in ambient conditions relative to the vehicle 100, with the sensitivity extended further to realize changes in at least one ambient condition relative to the vehicle.

Also, some of the sensor devices may be effectively blocked depending upon the driving mode of the vehicle 100. For example, when the vehicle 100 is traveling at highway-level speeds, the audible sensor devices 102 simply detect excessive white noise due to the air moving across the microphone pick-up and may not be sufficiently filtered to remove the extraneous data input. In such instances, the input from the audible sensor devices 102 may be switched to an off or a sleep mode until the vehicle 100 returns to a lower rate of speed.

The vehicle 100 can also include options for operating in manual mode, autonomous mode, and/or driver-assist mode. When the vehicle 100 is in manual mode, the driver manually controls the vehicle systems, which may include a propulsion system, a steering system, a stability control system, a navigation system, an energy system, and any other systems that can control various vehicle functions (such as the vehicle climate or entertainment functions, etc.).

The vehicle 100 can also include interfaces for the driver to interact with the vehicle systems, for example, one or more interactive displays, audio systems, voice recognition systems, buttons and/or dials, haptic feedback systems, or any other means for inputting or outputting information.

In an autonomous mode, vehicle computing units, including the occupancy control unit 200, can be used to control one or more of the vehicle systems without the vehicle user's direct intervention. Some vehicles may also be equipped with a "driver-assist mode," in which operation of the vehicle 100 can be shared between the vehicle user and a computing device.

For example, the vehicle user can control certain aspects of the vehicle operation, such as steering, while the computing device can control other aspects of the vehicle operation, such as braking and acceleration. When the vehicle 100 is operating in autonomous (or driver-assist) mode, the computing device issues commands to the various vehicle systems to direct their operation, rather than such vehicle systems being controlled by the vehicle user.

In FIG. 2, a block diagram of the occupancy control unit 200 in the context of a vehicle network environment is provided. While the occupancy control unit 200 is depicted in abstract with other vehicular components, the occupancy control unit 200 may be combined with other system components of the vehicle 100 (see FIG. 1). Moreover, the vehicle 100 may also be an automobile or any other passenger or non-passenger vehicle such as, for example, a terrestrial, aquatic, and/or airborne vehicle.

As shown in the example of FIG. 2, the occupancy control unit 200 communicates with a head unit device 202 through audio/visual control unit 208, and communicates with the sensor devices 102, 104, 106, 108 and/or 110 through a sensor control unit 214.

As may be appreciated, the communication path 213 of the vehicle network 212 may be formed a medium suitable for transmitting a signal such as, for example, conductive wires, conductive traces, optical waveguides, or the like. Moreover, the communication path 213 can be formed from a combination of mediums capable of transmitting signals.

In one embodiment, the communication path 213 can include a combination of conductive traces, conductive wires, connectors, and buses that cooperate to permit the transmission of electrical data signals to components such as processors, memories, sensors, input devices, output devices, and communication devices. Accordingly, the communication path 213 may be provided by a vehicle bus, or combinations thereof, such as for example, a Body Electronic Area Network (BEAN), a Controller Area Network (CAN) bus configuration, an Audio Visual Communication-Local Area Network (AVC-LAN) configuration, a Local Interconnect Network (LIN) configuration, a Vehicle Area Network (VAN) bus, and/or other combinations of additional communication-system architectures to provide communications between devices and systems of the vehicle 100.

The term "signal" relates to a waveform (e.g., electrical, optical, magnetic, mechanical or electromagnetic), such as DC, AC, sinusoidal-wave, triangular-wave, square-wave, vibration, and the like, capable of traveling through at least some of the mediums described herein.

The sensor control unit 214 receives sensor data 216 from the audible sensor device 102, sensory input device 104, video sensor device 106, seat occupancy sensor device 108, and/or door sensor device(s) 110. For further example, the sensor data 216 operates to permit object detection external to the vehicle, such as for example, other vehicles, roadway obstacles, traffic signals, signs, trees, etc. The sensor data 216 allow the vehicle 100 (see FIG. 1) to assess its environment in order to maximize safety for vehicle passengers and objects and/or people in the environment.

As an example, the sensory input device 104 provides tactile or relational changes in the ambient conditions of the vehicle, such as an approaching person, object, vehicle, etc. The one or more of the sensory input devices 104 can be configured to capture changes in velocity, acceleration, and/or distance to objects relative to the travel of the vehicle 100, as well as an angle of approach. The sensory input devices 104 may be provided by a Light Detection and Ranging (LIDAR) system and/or milliwave radar devices. As an example, the sensory input devices 104 may identify objects in the roadway (such as other vehicle, debris, etc.), and may identify moving objects adjacent the roadway that may present a hazard to the vehicle 100 (such as animals and/or debris coming within the roadway).

Sensor data 216 relating to the video sensor devices 106a and 106b may operate to capture still-frame and/or video images within associated fields of view for display to the touch screen 206 of the head unit device 202. The captured still-frame and/or video images may also be used by the occupancy control unit 200 for announcement and/or transmission to a user device upon a vehicle occupancy change event, such as to user equipment including handheld mobile devices 222 and 236, the computer 224 and/or the server 233.

A vehicle occupancy change event, for example, may occur when the vehicle 100 comes to stop (that is, the vehicle velocity is at, or about, zero). For an occupant to leave or enter the vehicle 100 an egress/ingress condition occurs, such as a vehicle door opening. As may be appreciated, a door sensor device(s) 110 may indicate vehicle door status, and be provided through sensor data 216 to the sensor control unit 214, and through the vehicle network 212 to the occupancy control unit 200.

To sense vehicle occupants, sensor data 216 relating to seat occupancy sensor device 108 operates to convey a size and a weight of seated vehicle seat occupants. By sensing an occupant weight, the occupancy control unit 200 may classify the occupant type (that is, adult, juvenile, baby, etc.) for a vehicle seat.

An example embodiment of the sensor device 108 may include a pressure sensor and a fluid-filled bladder (e.g., silicone, silicone gel, etc.). Other examples may include seat track sensors, in which a sensor may be located at each corner of a seat track. These sensors read the pressure applied from four corners of a vehicle seat unit.

In effect, when a person sits on the vehicle seat, the pressure sensor of the seat occupancy sensor device 108 signals the occupant's weight via the sensor data 216 to the sensor control unit 214, which may then be provided to the occupancy control unit 200 via the vehicle network 212 and the communication path 213.

Also, seat belt tension sensors (not shown) may permit the occupancy control unit 200 to discern whether pressure on the seat belt strap and associated anchor originates by a person occupying a respective vehicle seat or by an inanimate heavy object on the seat (for example, groceries, packages, luggage, etc.).

The door sensor device(s) 110 operate to sense when a vehicle door is open and/or closed. When the vehicle 100 comes to a stand-still (such that the velocity of the vehicle is at, or about, zero kilometers per hour), the opening and/or closing of a vehicle door indicates a vehicle occupancy change event, which may also be confirmed through the pressure change to a seat occupancy sensor device(s) 108.

Door sensor device(s) 110 may be based on an electrical proximity principle. For example, a magnetic strip may be located on a vehicle door frame and an opposing strip may be located on the adjacent vehicle door. A conductor then carries the sensor data 216 to the sensor control unit 214. In operation, while the vehicle door is closed, the strip on the vehicle door could read the opposite one on the vehicle door frame, providing a closed electrical circuit. When the vehicle door is open, the magnetic strip on the vehicle door frame door magnet is carried too far away from the opposite one on the door frame, causing an open circuit condition. The sensor control unit 214 may then sense that the respective vehicle door is open.

Other examples of door sensor device(s) 110 include sensors on door locks, motion sensors calibrated to sense door opening/closing, etc.

The audio/visual control unit 208 may receive the sensor data 216 via the communication path 213 and vehicle network 212, and may produce display data 209 for display by the touch screen 206 (for example, back-up camera images, side images, motion detection images, night-vision images, etc.). The audio/visual control unit 208 operates to receive user input data 211 from the head unit device 202, which may be from the tactile input 204, microphone input, eye-tracking input, etc.

The head unit device 202 includes, for example, a tactile input 204 and a touch screen 206. The touch screen 206 operates to provide visual output or graphic user interfaces such as, for example, maps, navigation, entertainment, information, infotainment, and/or combinations thereof.

The touch screen 206 may include mediums capable of transmitting an optical and/or visual output such as, for example, a cathode ray tube, light emitting diodes, a liquid crystal display, a plasma display, etc. Moreover, the touch screen 206 may, in addition to providing visual information, detect the presence and location of a tactile input upon a surface of or adjacent to the display. Accordingly, the display may receive mechanical input directly upon the visual output provided by the touch screen 206. For further example, the touch screen 206 may receive user input via a graphic user interface, such as to receive inputs for biometric information for sensing an identification for each vehicle occupant (such as fingerprint and/or handprint data). Additionally, it is noted that the touch screen 206 can include at least one or more processors and one or more memory modules.

The head unit device 202 may also include tactile input and/or control inputs such that the communication path 213 communicatively couples the tactile input to other control units and/or modules of the vehicle 100 (see FIG. 1). The tactile input data may be provided by devices capable of transforming mechanical, optical, or electrical signals into a data signal capable of being transmitted via the communication path 213.

The tactile input 204 may include a number of movable objects that each transform physical motion into a data signal that can be transmitted over the communication path 213 such as, for example, a button, a switch, a knob, a microphone device that may be used for voice identification, an eye-tracking input device for retinal identification, etc.

The touch screen 206 and the tactile input 204 may be combined as a single module, and may operate as an audio head unit or an infotainment system of the vehicle 100. The touch screen 206 and the tactile input 204 can be separate from one another and operate as a single module by exchanging signals.

Touch screen 206 may include a display screen, such as a liquid crystal display (LCD), light emitting diode (LED), plasma display or other two dimensional or three dimensional display that displays graphics, text or video in either monochrome or color in response to display data 209.

A microphone may receive audible commands from a vehicle user. In the context of the method and device disclosed herein, the vehicle occupants may each issue audible commands identifying the individual through voice and/or speech recognition. For example, determining speech features that may differ between individuals in consideration that each has a unique speech pattern based on the occupant's anatomy (for example, mouth size and shape, throat size, etc.), and based on their behavioral patterns (for example, voice pitch, speaking style and/or cadence, regional accent, etc.).

As may be appreciated, the head unit device 202 may include other biometric devices for occupant identification, such as a finger print receiver, retinal scan device, face recognition camera, pattern inputs, etc.

The occupancy control unit 200 may include an antenna 220 for wireless communications 226 with user devices through a network cloud 218. For example, the occupancy control unit 200 may wirelessly communicate with, for example, a handheld mobile device 222 over wireless communication 230, a computer 224 over wireless communication 230, a server 233 over wireless communication 232 via the network cloud 218, and/or may wirelessly communicate through direct wireless communication 238, such as with a handheld mobile device 236.

The user equipment including, for example, computer 224, server 233, and/or handheld mobile devices 222 and 236, may be a device including hardware (for example, chipsets, processors, memory, etc.) for communicatively coupling with the network cloud 218 and/or directly with the occupancy control unit 200 via the antenna 220.

As may be appreciated by those skilled in the art, the antenna 220 may be a shared device, providing wireless communication to other control units 208 and 214, for example. The antenna 220 and associated wireless communication interfaces may be in a shared relation and also be located with other control units other than the occupancy control unit 200.

The antenna 220 may include one or more conductive elements that interact with electromagnetic signals transmitted by global positioning system satellites. The received signals may be transformed into a data signal indicative of the location (for example, latitude and longitude positions), and further indicative of the positioning of the vehicle 100, that can be indicated on a map displayed via the touch screen 206, or otherwise displayed via the respective displays of the user equipment 222, 224, 233 and/or 236, by way of example.

The wireless communications 226 and 238 (as well as wireless communications 228, 230 and/or 232) may be based on one or many wireless communication system specifications. For example, wireless communication systems may operate in accordance with one or more standards specifications including, but not limited to, 3GPP (3rd Generation Partnership Project), 4GPP (4th Generation Partnership Project), 5GPP (5th Generation Partnership Project), LTE (long term evolution), LTE Advanced, RFID, IEEE 802.11, Bluetooth, AMPS (advanced mobile phone services), digital AMPS, GSM (global system for mobile communications), CDMA (code division multiple access), LMDS (local multi-point distribution systems), MMDS (multi-channel-multi-point distribution systems), IrDA, Wireless USB, Z-Wave, ZigBee, and/or variations thereof.

Figure 3:
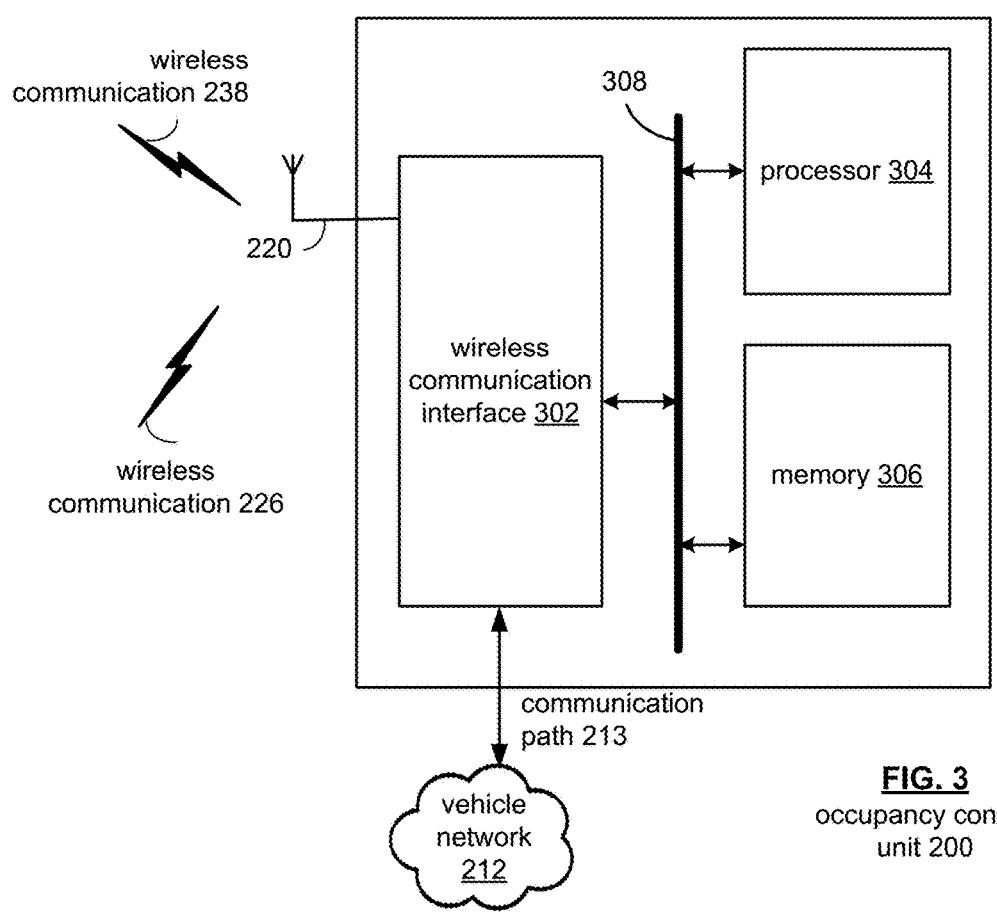
FIG. 3 shows a block diagram of a occupancy control unit of FIG. 1.

FIG. 3 is a block diagram of an occupancy control unit 200, which includes a wireless communication interface 302, a processor 304, and memory 306, that are communicatively coupled via a bus 308.

The processor 304 can be a conventional central processing unit or other type of device, or multiple devices, capable of manipulating or processing information. As may be appreciated, processor 304 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions.

The memory and/or memory element 306 may be a single memory device, a plurality of memory devices, and/or embedded circuitry of the processor 304. Such a memory device may be a read-only memory, random access memory, volatile memory, non-volatile memory, static memory, dynamic memory, flash memory, cache memory, and/or any device that stores digital information.

The memory 306 is capable of storing machine readable instructions such that the machine readable instructions can be accessed by the processor 304. The machine readable instructions can comprise logic or algorithm(s) written in programming languages, and generations thereof, (e.g., 1GL, 2GL, 3GL, 4GL, or 5GL) such as, for example, machine language that may be directly executed by the processor 304, or assembly language, object-oriented programming (OOP), scripting languages, microcode, etc., that may be compiled or assembled into machine readable instructions and stored on the memory 306. Alternatively, the machine readable instructions may be written in a hardware description language (HDL), such as logic implemented via either a field-programmable gate array (FPGA) configuration or an application-specific integrated circuit (ASIC), or their equivalents.

Accordingly, the methods and devices described herein may be implemented in any conventional computer programming language, as pre-programmed hardware elements, or as a combination of hardware and software components.

Note that when the processor 304 includes more than one processing device, the processing devices may be centrally located (e.g., directly coupled together via a wired and/or wireless bus structure) or may be distributed located (e.g., cloud computing via indirect coupling via a local area network and/or a wide area network). Further note that when the processor 304 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry.

Still further note that, the memory 306 stores, and the processor 304 executes, hard coded and/or operational instructions corresponding to at least some of the steps and/or functions illustrated in FIGS. 1-7 to perform occupancy control features and methods described herein.

The wireless communications interface 302 generally governs and manages the vehicle user input data via the vehicle network 212 over the communication path 213 and/or wireless communication 226 and 238, for example. The wireless communication interface 302 also manages occupancy controller unit 200 input data such as sensor data 216 from sensor devices 102, 104, 106a, 106b, 108 and/or 110, and user input data 211 provided by head unit device 202. The sensor data 216 and user input data 211 operate to provide identification parameter sensing related to each of a set of initial vehicle occupants for the vehicle 100.

There is no restriction on the present disclosure operating on any particular hardware arrangement and therefore the basic features herein may be substituted, removed, added to, or otherwise modified for improved hardware and/or firmware arrangements as they may develop.

As may be appreciated, the audio/visual control unit 208, and the sensor control unit 214 include similar architectures as described with relation to the occupancy control unit 200 (see FIG. 2). Generally, the control units include a communication interface, a processor, and memory, which are communicatively coupled via a bus, as described in relation to occupancy control unit 200. Also, other control units may include additional circuitry to provide additional functionality.

The wireless communication interface 302 of the occupancy control unit 200 may operate several wireless communication technologies ranging from national and/or international cellular telephone systems to the Internet to point-to-point in-home wireless networks to radio frequency identification (RFID) systems. Each type of communication system is constructed, and hence operates, in accordance with one or more communication standards.

For instance, wireless communication systems may operate in accordance with one or more standards including, but not limited to, 3GPP (3rd Generation Partnership Project), 4GPP (4th Generation Partnership Project), 5GPP (5th Generation Partnership Project), LTE (long term evolution), LTE Advanced, RFID, IEEE 802.11, Bluetooth, AMPS (advanced mobile phone services), digital AMPS, GSM (global system for mobile communications), CDMA (code division multiple access), LMDS (local multi-point distribution systems), MMDS (multi-channel-multi-point distribution systems), and/or variations thereof.

FIG. 4 shows an example of an identification parameter 400 related to a vehicle occupant. The identification parameter 400 includes an identification field 402, a priority field 404, a vehicle authority level field 406, and vehicle control state parameter 408.

The identification field 402 includes an identification value for an individual that may be associated with the vehicle 100. The identification value may relate to an adult, a teen, a minor, or unknown individual. The identification value may be selected by a person with administrator level authority over the configuration of the vehicle 100.

The priority field 404 includes a priority value for the identification value of the identification field 402. The priority value may provide a basis for prioritizing vehicle authority levels among each of a vehicle occupant, and a vehicle control priority among the vehicle occupants. That is, the values provide for an occupancy control unit 200 to discern a "leader" or "alpha" vehicle occupant, for applying their associated vehicle control state parameters 408 for operation of the vehicle 100.

The vehicle control state parameter 408 includes operational values for the vehicle 100. The vehicle control state parameter 408 includes, for example, a range field 410, a speed field 412, a roadway field 414, a time-of-day field 416, and a notification field 418. As may be appreciated, the number of fields for the vehicle control state parameter 408 may be greater or fewer based upon the desires of a vehicle user with sufficient administrator authority.

The range field 410 generally relates to whether a vehicle range is restricted. For example, for a minor vehicle occupant, the vehicle range may be restricted to a certain area, such as measured from a home location, a city limit, etc.

The speed field 412 generally relates to restrictions or governors on the speed of travel for a vehicle 100. For example, again with a child or teen vehicle occupant, the vehicle speed may be limited to within a given speed limit, having the vehicle travel on paths that respect the speed level. The vehicle 100, however, may have further intelligence to recognize exceptions, such as routes that at times may exceed the speed value limitation.

The roadway field 414 generally relates to types of roadways that may be sought for routes. For example, the roadways may be limited to city streets at a low end up to toll-level roads (and the associated speed levels). There occupancy control unit 200 may operate to recognize conflicts within the values selected by an administrator (such as limiting speed to well below a maximum allowable speed for a toll and/or highway roadway). The occupancy control unit 200 may also limit an administrator to choices that do not conflict with one another, such as when toll roads are permissible, that a speed limitation may not be practicable (and accordingly, not permitted).

The time-of-day field 416 generally relates to the times that an individual may travel using the vehicle 100. For example, the times may simply be "daytime," or a block of time, such as 0800-0600, etc.

The notification field 418 provides a medium to and whom a notification is to be provided based on the vehicle control priority with respect to the occupants of the vehicle 100. The medium value may include text, email, call, etc. The notification may be to other individuals identified by the identification field, and/or individuals that may not necessarily be identified, such as relatives that live relatively far apart, etc.

FIG. 5 shows an example of a populated identification parameter 400 related to several possible vehicle occupants.

The populated identification parameter 500 may be populated through a graphic user interface displayed by the touch screen 206 of the head unit device 202, by an app or web-based entry via the user equipment of the handheld mobile device 236, the computer 224, the handheld mobile device 222, etc. (see FIG. 2).

Also, the handheld mobile devices 222 and/or 236 may include electronic identification data that the occupancy control unit 200 may access and/or read to sense an identification parameter for a vehicle occupant. For example, for wireless communications, the devices 222 and/or 236 include network identifiers, such as a unique device identifier (UDID), which is a combination of 40 numbers and letters set on iPhones, iPads, and other Apple products, an Android ID on devices executing an Google Android Operating System, an international mobile equipment identity (IMEI), which is a cell phone equipment identifier set by manufacturers, an international mobile subscriber identity (IMSI), a subscriber identification number set by cell phone networks, and the like.

The resulting identification parameter 500, having been populated by an individual with administrator level authority, may be stored locally by the occupancy control unit 200, or remotely such as via the server 233, which may be operated and maintained by a third party vendor.

As shown, the identification parameter 400 includes entries for a number of possible vehicle occupants that may be greater than the number of seating positions for the vehicle. For example, the vehicle 100 may include five seat positions (two in front, three in back), but the number of possible occupants that may travel in the vehicle 100 exceed the number of available seats. In this manner, a set of vehicle occupants may include a combination of the individuals of the identification field 402 that may be family members as well as unknown individuals. Examples of unknown individuals may be new friends and/or acquaintances, infrequent travel companions, etc.

In the example of FIG. 5, the identification field 402 includes identifier entries, such as "Adult_01," "Adult_02," "Teen_01," Teen_02," "Adult_03," and "Unknown_01." Priority levels are assigned by the administrator to the other identified possible occupants for the vehicle 100, and an associated vehicle authority level, which may be as an "administrator" authority level (with read/write permission), "adult" authority level, "juvenile" authority level, "guest" authority level, etc., with generally ranging from unlimited vehicle permissions to severely limited vehicle permissions for a "guest."

As shown, "Adult_01" has a highest priority of "01," and an authority level of "administrator," which permits the individual a read/write authority for all individuals for the vehicle 100. In the vehicle control state parameter 508, "Adult_01" is not limited with regard to permissible range, speed, roadway, and time-of-day, as reflected by the infinity value "∞". In the present example, for notification by the occupancy control unit 200, "Adult_01" has opted for a text message to "Adult_02" relating to certain events. For example, the message substance may include an occupant list, and may be transmitted upon a start to a destination, with a mapping of the path to be taken. Other events may include arrival at a destination, a vehicle occupancy change event, etc.

As another example, "Teen_01" has a priority of "05," and an authority level of "juvenile." The "juvenile" value indicates a restricted vehicle control state parameter 508, having a permissible range field of "15" miles, a speed of "40" miles-per-hour, where routes include (where practicable) "street" paths (as opposed to highway and/or toll roadways), and travel is restricted to daytime hours for the security field.

When the set of vehicle occupants is a single vehicle occupant, and that occupant is unidentifiable, the identification sensing resorts to an "Unknown_01" classification, which has a low priority "99," an authority level of "guest," and severe vehicle restrictions (that is, range, speed, roadway, time-of-day fields are set to "zero") via the vehicle control state parameter 508.

A vehicle occupant may be unidentifiable namely because they are not included in the identification parameter 500. Moreover, though not enumerated in the identification parameter 500, the occupancy control unit 200 may collect identity data relating to "Unknown_01," via sensor data 216 from a seat occupancy sensor device 108, from biometric data (for example, fingerprint recognition, face recognition, voice recognition, etc.) via user input data 211 of the head unit device 202, or an electronic signature/identifier such as by user equipment, such as handheld mobile devices 222 and/or 236, a key fob or other near field communication device (e.g., Bluetooth, RFID, etc.). Such information may then be conveyed based on the notification state of the vehicle control state parameter 508. In this example, the administrator (Adult_01) is sent a text, email, and call notification, which may include the identifier data, still images, and/or video images collected by the occupancy control unit 200.

As may be appreciated, a set of vehicle occupants may include a number of individuals up to the seating accommodations of the vehicle, which may be from two for small sports vehicles, to nine or more for larger SUV type vehicles.

FIGS. 6A through 6D provide an example of a method for applying a control state based on vehicle occupancy of an autonomous vehicle 100. As shown, the example vehicle 100 includes a maximum five (5) possible seating locations (defined has having safety restraining equipment, such as seat belts, airbags, etc.).

Figure 6A:
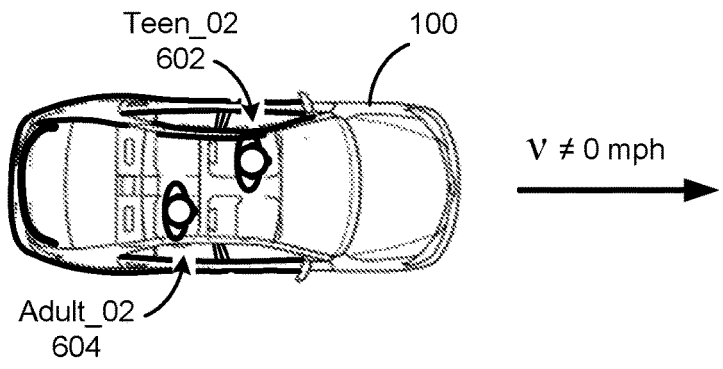
FIGS. 6A-6D provide an example of a method in an occupancy control unit of FIG. 1 for applying a control state based on vehicle occupancy of an autonomous vehicle.

In the example of FIG. 6A, an occupancy control unit 200 had sensed an identification parameter for each of set of initial vehicle occupants, which have been identified as Teen_02 602 and Adult_02 604. The Teen_02 602 occupies the front driver-side seat (the side closer to the center of a roadway, which for regions with right-hand traffic rule of the road, the vehicle's left-side), and the Adult_02 604 is seated in the rear passenger-side seat.

As may be appreciated, though the occupant with the lower level of higher priority and privileges is seated in the traditionally-dominant seating (that is, at the "drivers wheel"), that the Adult_02 604 parameters govern operation of the autonomous vehicle 100, and not those of the Teen_02 602. That is, the occupancy control unit 200 determines vehicle control based on occupant identity, and not occupant position within the vehicle.

As set out by the example populated identification parameter 500 of FIG. 5, the Teen_02 602 has a priority of "04," and the Adult_02 604 has a priority of "02."

The occupant control unit 200 prioritizes the vehicle for each of the vehicle occupants for an initial vehicle control priority, which in this example is the Adult_02 604, and the initial vehicle control state parameter 508 provides for unlimited range, speed, roadways, and time-of-day (see, e.g., FIG. 5).

As indicated in FIG. 6A, the vehicle is in motion, and is autonomously traveling to multiple destinations, such as school for Teen_02 602 and work for the Adult_02 604. Accordingly, the route provides for an occupancy change event, in which either the Teen_02 602 or the Adult_02 604 depart the vehicle. As may be appreciated, more complex destinations may be implemented and managed by the occupancy control unit 200, such as additional varied destinations for a full vehicle occupancy (such as five occupants for the present example).

Figure 6B:
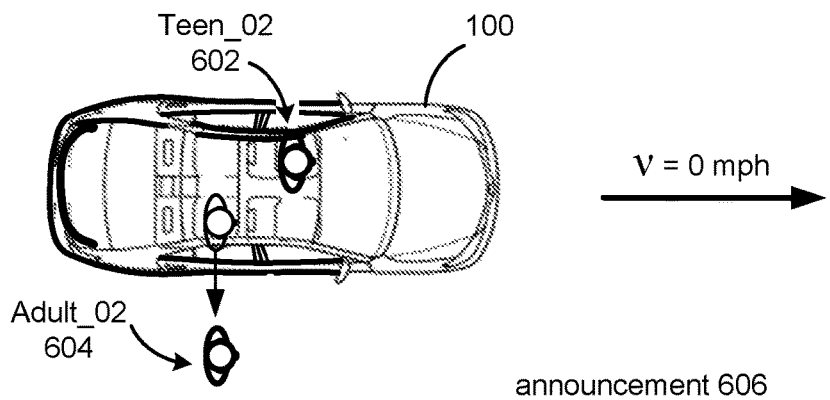

In the example of FIG. 6B, an occupancy control unit 200 determines a vehicle occupancy change event has occurred, in which the Adult_02 606 departs the vehicle. In this example, the vehicle 100 has a velocity at or near zero (that is, has stopped), and the rear passenger-side door has been opened, which indicates an exit from the vehicle. The Adult_02 604 may exit the vehicle because of arriving at their work destination.

The occupancy control unit 200 may operate to verify the exit of an individual through expected changes in the respective seat occupancy sensor device 108 for the rear passenger side seat.

In the example of FIG. 6B, the occupancy control unit 200 operates to sense an identification parameter for each vehicle occupant for a set of subsequent vehicle occupants (that is, subsequent in time relative to the vehicle occupancy change event). The sensing may occur following a period in which other occupants may enter (or re-enter) the vehicle 100, but in general, before the vehicle 100 continues on a path to arrive at the school destination for the Teen_02.

In the example of FIG. 6B, the occupancy control unit 200 senses the identification parameter for each vehicle occupant for a set of subsequent vehicle occupants. The set of subsequent vehicle occupants in the present example includes one individual—the Teen_02 602, and has a remaining destination for school.

The occupancy control unit 200 priorities the vehicle authority level for each vehicle occupant for a set of subsequent vehicle occupants, which includes the Teen_02 602.

Figure 6C:
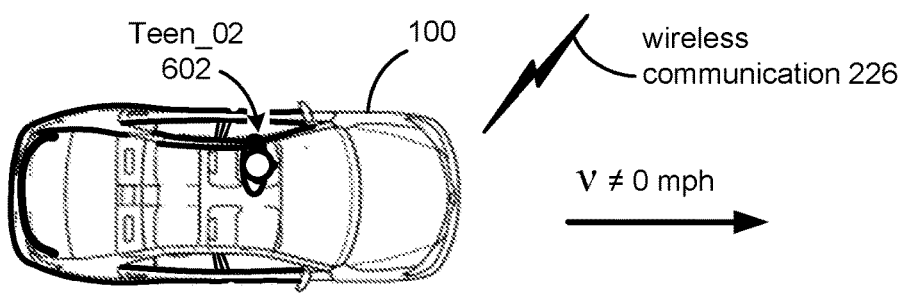

In FIG. 6C, the occupancy control unit 200, following the occupancy change event, subsequently announces the occurrence of the vehicle change event and the set of subsequent vehicle occupants via the wireless communication 226. The announcement 606 may follow sensing of the set of subsequent vehicle occupants, but before the vehicle 100 continues to the second destination (e.g., school), or by continuing to the second destination. As may be appreciated, the announcement is useful to monitor the vehicle and its occupants by the vehicle owner, and/or others having responsibility for the well-being of the occupants.

The announcement 606 may be as set out by the notification parameter of the vehicle control state parameter 508 (see FIG. 5). In the present example, the announcing is provided via a text message to the Adult_01 and Adult_02 of the populated identification parameter 500. As may also be appreciated, the announcement 606 may also include issuing an audible announcement through an audio/visual system of the vehicle, and may further include and a captured image of the vehicle interior (with occupants) and a location mapping of the captured image.

The occupancy control unit 200, based on the subsequent vehicle control priority, replaces the vehicle control state parameter in the autonomous vehicle mode. In the present example, the vehicle control state parameter is that for the Teen_02 602, which is a range of up to 25 miles, up to 50 miles-per-hour, may include roadways up to toll roadways, and a time-of-day between 0800-2100.

The vehicle 100, based upon the replaced vehicle control state parameter, takes a path to the second destination within this restrictions; provided, however, that the vehicle 100 has logic incorporated that allows deviation sufficient to come within compliance with the restrictions. For example, when the first destination (workplace for the Adult_02) is outside the permissible range for the Teen_02, the vehicle 100 may travel to within the permissible range on a "most efficient vector" basis to comply with the restrictions. Also, the route may be adjusted to further consider routes within the speed and roadway restrictions (see, e.g., FIG. 5).

Figure 6D:
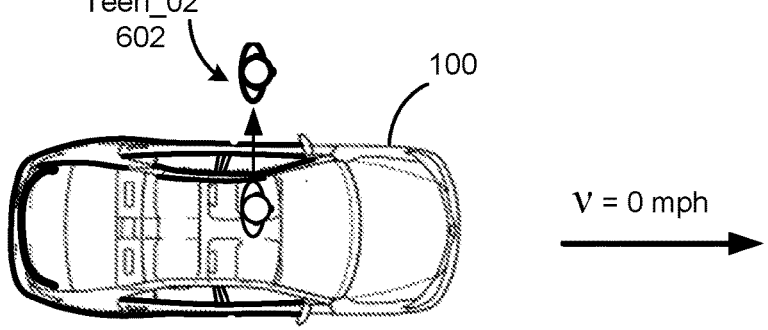

In the example of FIG. 6D, the autonomous vehicle 100 arrives at the second destination (that is, school of the Teen_02). Another vehicle occupancy change event occurs, where the Teen_02 602 exits the vehicle when the velocity of the vehicle is at or near zero miles per hour. Subsequent to the final destination, and a null occupant set results, in which the vehicle is empty, the vehicle 100 may autonomously park itself, or autonomously proceed to a predesignated destination set out by the Adult_02 (or by an individual with administrator privileges).

Figure 7:
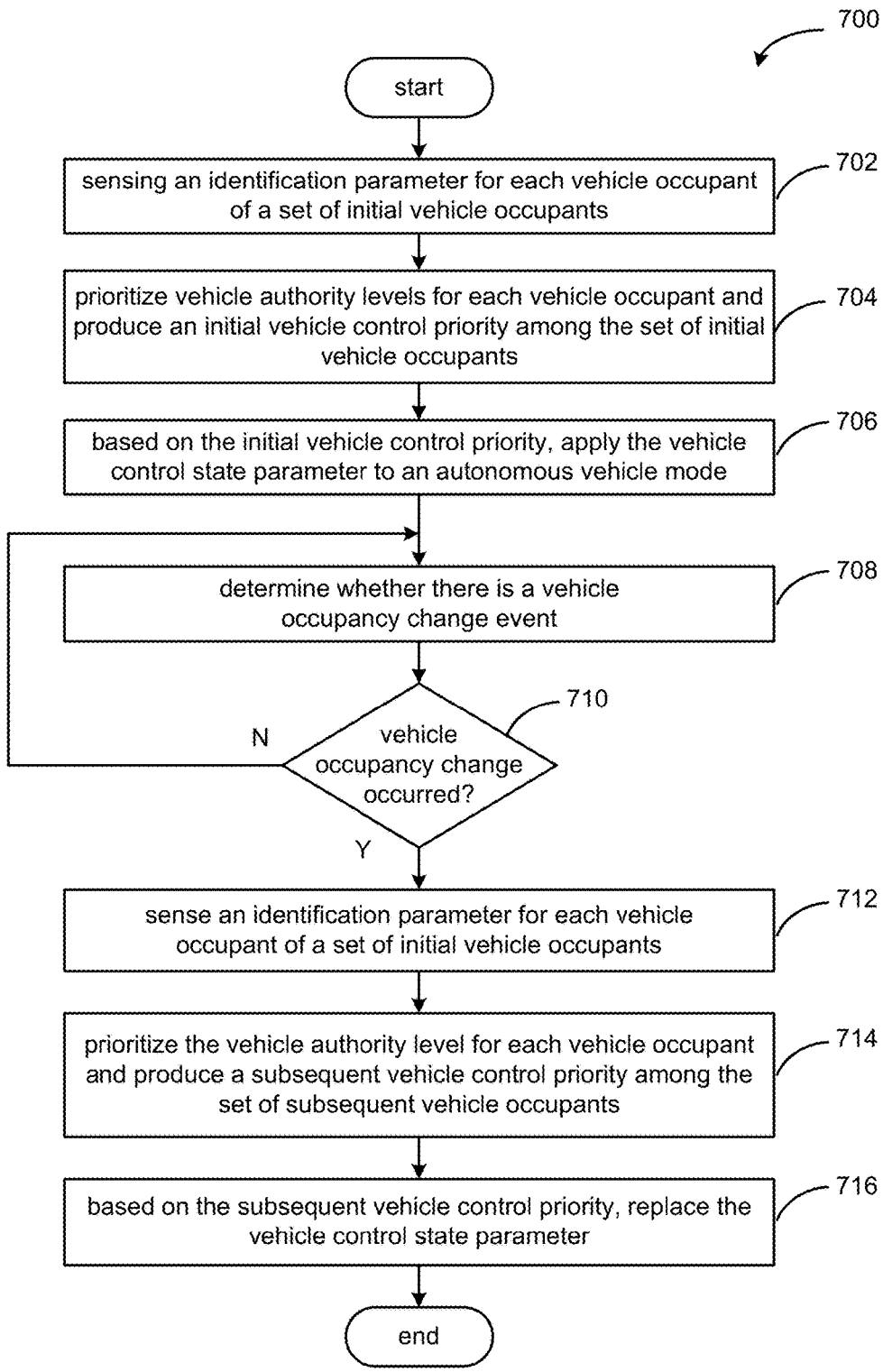
FIG. 7 shows an example process in for changing autonomous vehicle operational mode based on occupant changes.

FIG. 7 shows an example process 700 for changing autonomous vehicle operational mode based on occupant changes. The example process 700 takes into account vehicle occupant changes in a route having multiple destinations in which vehicle occupants depart the vehicle and may enter the vehicle, and altering the vehicle operation based on the occupant changes.

At operation 702, an occupancy control unit 200 senses an identification parameter for each of a set of initial vehicle occupants. The sensing may be based on at least one of receiving biometric input data input through a graphic user interface of a head unit device 202 (see FIG. 2), weight data for each weight sensor of an autonomous vehicle seating position, radio frequency identification (RFID) data from an RFID tag (such as, e.g., a key fob, jewelry and/or clothing with embedded RFID tags, etc.), and/or receiving electronic signature data from a handheld mobile device (such as, e.g., a unique device identifier (UDID), an Android ID, an international mobile equipment identity (IMEI), an international mobile subscriber identity (IMSI), etc.).

The identification parameter includes a vehicle authority level and a vehicle control state parameter. At operation 704, the vehicle authority level is prioritized for the each vehicle occupant of the set of initial vehicle occupants, and produces an initial vehicle control priority.

At operation 706, based on the initial vehicle control priority, applying the vehicle control state parameter to an autonomous vehicle mode.

The occupancy control unit 200, at operation 708, determines whether a vehicle occupancy change event occurs. When, at operation 710, a vehicle occupancy change event occurs, the occupancy control unit 200 operates to change in vehicle control state parameters to the autonomous vehicle mode.

Upon the vehicle occupancy change event, the occupancy control unit 200 senses, at operation 712, an identification parameter for each vehicle occupant of a set of subsequent vehicle occupants, and at operation 714, prioritizes the vehicle authority level for the each vehicle occupant of the set of subsequent vehicle occupants and produces a subsequent vehicle control priority among the set of subsequent vehicle occupants.

At operation 716, based on the subsequent vehicle control priority, the occupancy control unit 200 replaces the vehicle control state parameter to the autonomous vehicle mode.

As may be appreciated, that upon a vehicle occupancy change event, the occupancy control unit 200 may subsequently announce the occurrence of the vehicle occupancy change event and also provide a set of subsequent vehicle occupants with the announcement. Also, the announcement may include at least one of an audible announcement through an audio/visual system of the autonomous vehicle, by a text-based announcement to a handheld mobile device according to the vehicle control state parameter, and/or a captured image including a location mapping of the captured image.

Moreover, when the subsequent vehicle occupant set is a null set, the occupancy control unit 200 operates to return autonomous vehicle to a predesignated location.

While particular combinations of various functions and features of the present invention have been expressly described herein, other combinations of these features and functions are possible that are not limited by the particular examples disclosed herein are expressly incorporated within the scope of the present invention.

As one of ordinary skill may appreciate, the term "substantially" or "approximately," as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items range from a difference of a few percent to magnitude differences. As one of ordinary skill may further appreciate, the term "coupled," as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (that is, where one element is coupled to another element by inference) includes direct and indirect coupling between two elements in the same manner as "coupled." As one of ordinary skill may further appreciate, the term "compares favorably," as may be used herein, indicates that a comparison between two or more elements, items, signals, et cetera, provides a desired relationship. For example, when the desired relationship is that a first signal has a greater magnitude than a second signal, a favorable comparison may be achieved when the magnitude of the first signal is greater than that of the second signal, or when the magnitude of the second signal is less than that of the first signal.

As the term "module" is used in the description of the drawings, a module includes a functional block that is implemented in hardware, software, and/or firmware that performs one or more functions such as the processing of an input signal to produce an output signal. As used herein, a module may contain submodules that themselves are modules.

Thus, there has been described herein an apparatus and method, as well as several embodiments including a preferred embodiment, for implementing an occupancy control unit and method operable to alter autonomous vehicle operation based on vehicle occupant changes over a route having multiple destinations caused by vehicle occupants departing and/or entering the vehicle.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretations so as to encompass all such modifications and equivalent structures as is permitted under the law.

What is claimed is:

1. A method for applying a vehicle control state parameter based on vehicle occupancy of an autonomous vehicle, the method comprising:
sensing an identification parameter for each of a set of initial vehicle occupants, wherein the identification parameter includes a vehicle authority level and the vehicle control state parameter;
prioritizing the vehicle authority level for the each of the set of initial vehicle occupants and producing an initial vehicle control priority among the set of initial vehicle occupants;
based on the initial vehicle control priority, applying the vehicle control state parameter to an autonomous vehicle operational mode;
determining whether a vehicle occupancy change event occurs based at least on a velocity of the autonomous vehicle; and
when the vehicle occupancy change event occurs:
re-sensing the identification parameter for each vehicle occupant of a set of subsequent vehicle occupants;
transmitting a notification including at least information pertaining to the set of subsequent vehicle occupants to one or more user devices associated with one or more persons specified by the vehicle control state parameter.

2. The method of claim 1, wherein the information pertaining to the set of subsequent vehicle occupants is in the form of at least one of:
a listing of the set of subsequent vehicle occupants;
an image of an interior of the vehicle; and
a video image of the interior of the vehicle.

3. The method of claim 2, wherein the notification further includes information indicating a location mapping of at least one of the image and the video image.

4. The method of claim 2, wherein the notification includes at least the information pertaining to the set of subsequent vehicle occupants and a mapping of a path from a current location of the vehicle to a destination location.

5. The method of claim 1, wherein the sensing further comprises at least one of:
receiving biometric input data input through a graphic user interface;
sensing weight data for each autonomous vehicle seating position;
receiving radio frequency identification (RFID) data from an RFID tag; and
receiving electronic signature data from a handheld mobile device.

6. The method of claim 1, wherein when the vehicle occupancy change event occurs, further comprising:
identifying the subsequent vehicle occupant having a vehicle control priority among the set of subsequent vehicle occupants; and
transitioning control of the autonomous vehicle to the subsequent vehicle occupant having the vehicle control priority by applying the vehicle control state parameter of the subsequent vehicle occupant to the autonomous vehicle operational mode.

7. The method of claim 1, further comprising:
when the set of subsequent vehicle occupants is a null set, returning the autonomous vehicle to a predesignated location.

8. A method for applying a vehicle control state parameter based on vehicle occupancy to an autonomous vehicle, the method comprising:
sensing a first set of vehicle occupants of the autonomous vehicle, wherein the first set of vehicle occupants each possessing an identification parameter source associating a vehicle authority level and the vehicle control state parameter;
determining a first vehicle control priority based on the vehicle authority level for the each vehicle occupant of the first set of vehicle occupants;
applying the vehicle control state parameter to an autonomous vehicle operational mode based on the first vehicle control priority;
determining whether a vehicle occupancy change event occurs based at least on a velocity of the autonomous vehicle; and
when the vehicle occupancy change event occurs:
re-sensing a second set of vehicle occupants of the autonomous vehicle, wherein the second set of vehicle occupants possessing the identification parameter source including the vehicle authority level and the vehicle control state parameter;
transmitting a notification including at least information pertaining to the second set of vehicle occupants to one or more user devices associated with one or more persons specified by the vehicle control state parameter.

9. The method of claim 8, wherein the information pertaining to the second set of vehicle occupants is in the form of at least one of:
a listing of the second set of vehicle occupants;
an image of an interior of the vehicle; and
a video image of the interior of the vehicle.

10. The method of claim 9, wherein the notification further includes information indicating a location mapping of at least one of the image and the video image.

11. The method of claim 9, wherein the notification includes at least the information pertaining to the second set of vehicle occupants and a mapping of a path from a current location of the vehicle to a destination location.

12. The method of claim 8, wherein the sensing further comprises:
receiving biometric input data input through a graphic user interface;
sensing weight data for each autonomous vehicle seating position;
receiving radio frequency identification (RFID) data from an RFID tag; and
receiving electronic signature data from a handheld mobile device.

13. The method of claim 8, wherein when the vehicle occupancy change event occurs, further comprising:
identifying the one vehicle occupant of the second set of vehicle occupants having a vehicle control priority among the second set of vehicle occupants; and
transitioning control of the autonomous vehicle to the one vehicle occupant having the vehicle control priority by applying the vehicle control state parameter of the one vehicle occupant to the autonomous vehicle operational mode.

14. An occupancy control unit for applying a vehicle control state parameter based on vehicle occupancy of an autonomous vehicle, the occupancy control unit comprising:
a wireless communication interface to service communications with user equipment and with a vehicle network;
one or more processors coupled to the wireless communication interface, the one or more processors for controlling operations of the occupancy control unit;

a memory coupled to the one or more processors, the memory for storing data and program instructions used by the one or more processors, wherein the one or more processors are configured to execute instructions stored in the memory to:
  sense an identification parameter for each vehicle occupant of a set of initial vehicle occupants, wherein the identification parameter includes a vehicle authority level and the vehicle control state parameter;
  determine an initial vehicle control priority based on the vehicle authority level for the each vehicle occupant of the set of initial vehicle occupants;
  apply the vehicle control state parameter based on the initial vehicle control priority;
  determine whether a vehicle occupancy change event occurs based at least on a velocity of the autonomous vehicle; and
  when the vehicle occupancy change event occurs:
    re-sense the identification parameter for each vehicle occupant of a set of subsequent vehicle occupants;
    transmit a notification including at least information pertaining to the set of subsequent vehicle occupants to one or more user devices associated with one or more persons specified by the vehicle control state parameter.

15. The occupancy control unit of claim 14, wherein the information pertaining to the set of subsequent vehicle occupants is in the form of at least one of:
  a listing of the set of subsequent vehicle occupants;
  an image of an interior of the vehicle; and
  a video image of the interior of the vehicle.

16. The occupancy control unit of claim 15, wherein the notification further includes information indicating a location mapping of at least one of the image and the video image.

17. The occupancy control unit of claim 15, wherein the notification includes at least the information pertaining to the set of subsequent vehicle occupants and a mapping of a path from a current location of the vehicle to a destination location.

18. The occupancy control unit of claim 14, wherein the one or more processors are further configured to execute further instructions stored in the memory to sense the identification parameter for the each vehicle occupant by at least one of:
  receiving biometric input data input;
  sensing weight data, via a weight sensor, for each autonomous vehicle seating position;
  receiving, via the wireless communication interface, radio frequency identification (RFID) data from an RFID tag; and
  receiving, via the wireless communication interface, electronic sensor data from a handheld mobile device.

19. The occupancy control unit of claim 14, wherein when the vehicle occupancy change event occurs, the one or more processors are further configured to execute further instructions stored in the memory to:
  identify the subsequent vehicle occupant having a vehicle control priority among the set of subsequent vehicle occupants; and
  transition control of the autonomous vehicle to the subsequent vehicle occupant having the vehicle control priority by applying the vehicle control state parameter of the subsequent vehicle occupant to an autonomous vehicle operational mode.

20. The occupancy control unit of claim 14, wherein the one or more processors are further configured to execute further instructions stored in the memory to:
  when the set of subsequent vehicle occupants is a null set, return the autonomous vehicle to a predesignated location.

* * * * *